(No Model.)  2 Sheets—Sheet 1.
H. TAYLOR.
LAND ROLLER.
No. 588,194.  Patented Aug. 17, 1897.
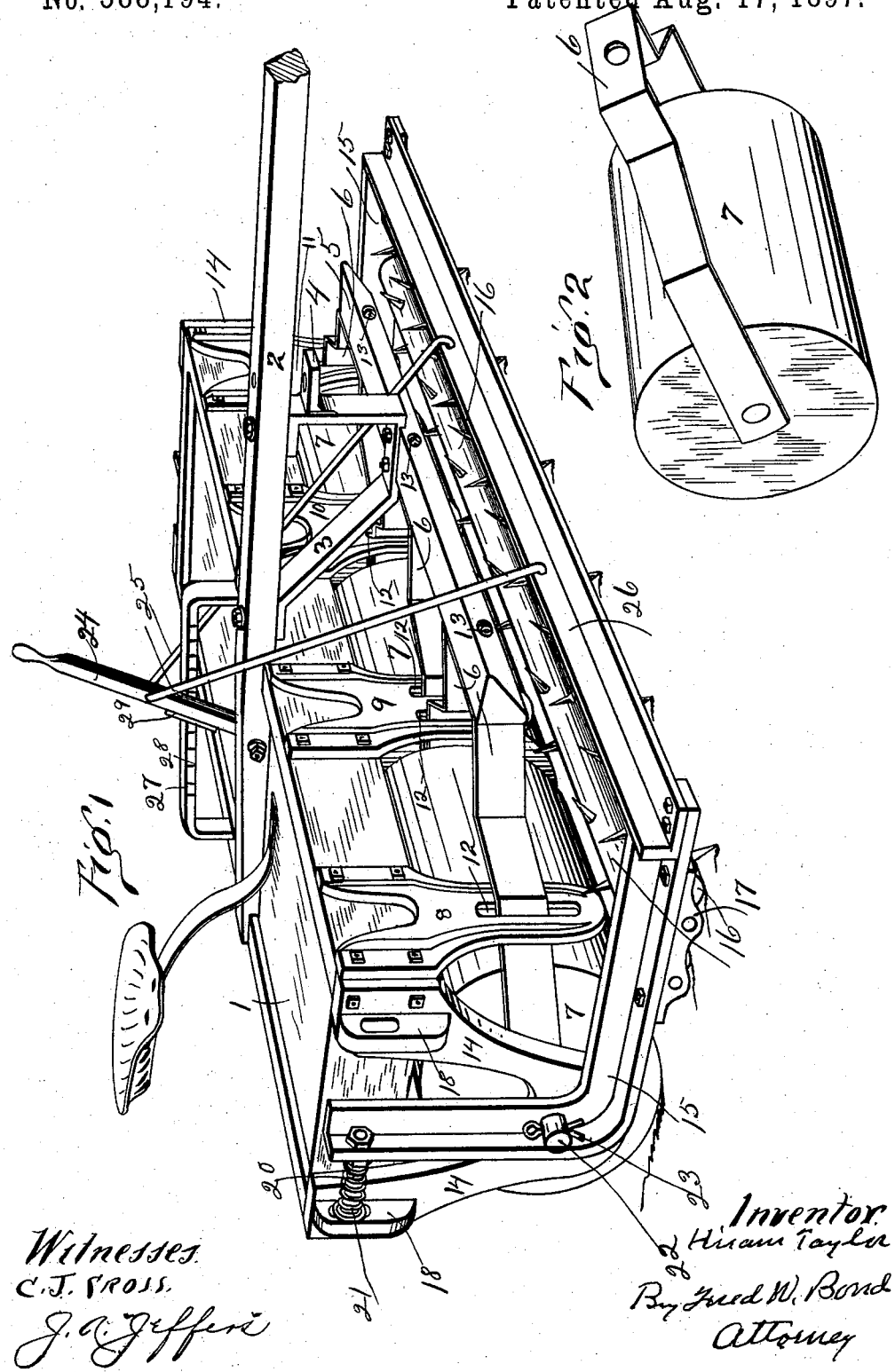
Witnesses
C. J. Sross.
J. A. Jefferi
Inventor
Hiram Taylor
By Fred W. Bond
Attorney (No Model.) 2 Sheets—Sheet 2.
H. TAYLOR.
LAND ROLLER.
No. 588,194. Patented Aug. 17, 1897.
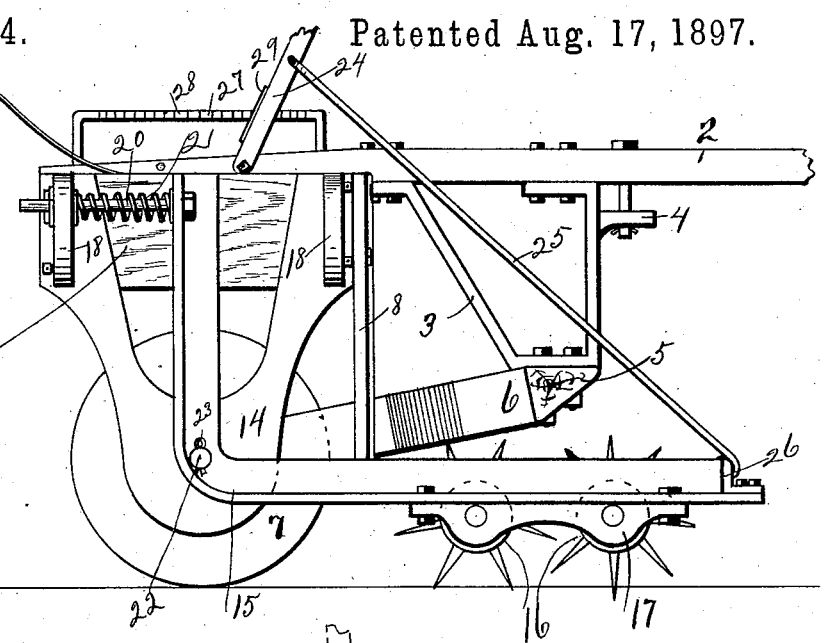
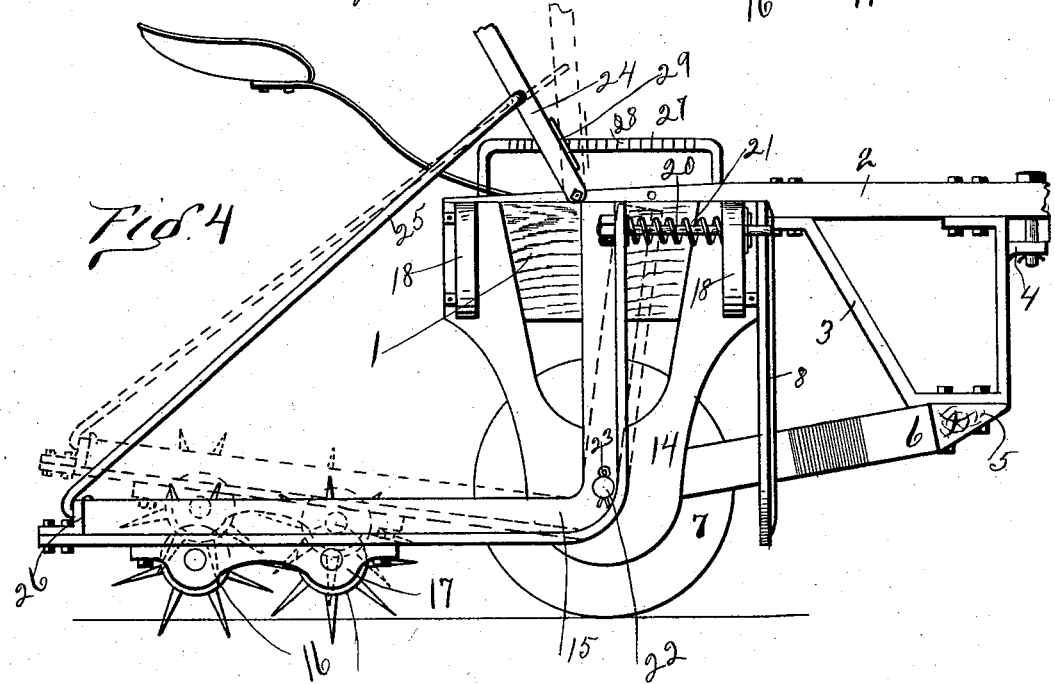
Witnesses:
C. J. Sross.
J. A. Jeffers
Inventor
Hiram Taylor
By Fred W. Bond
Attorney

UNITED STATES PATENT OFFICE.

HIRAM TAYLOR, OF SALEM, OHIO.

LAND-ROLLER.

SPECIFICATION forming part of Letters Patent No. 588,194, dated August 17, 1897.

Application filed March 15, 1897. Serial No. 627,508. (No model.)

*To all whom it may concern:*

Be it known that I, HIRAM TAYLOR, a citizen of the United States, residing at Salem, in the county of Columbiana and State of Ohio, have invented certain new and useful Improvements in Land-Rollers; and I do hereby declare that the following is a full, clear, and exact description of the same, reference being had to the annexed drawings, making a part of this specification, and to the figures of reference marked thereon, in which—

Figure 1 is a perspective view of the roller. Fig. 2 is a view showing one of the rollers and its connecting-yoke. Fig. 3 is an end view showing the pulverizing-rollers located in front of the rollers. Fig. 4 is a similar view showing the pulverizing-rollers located in the rear of the rollers.

The present invention has relation to land-rollers; and it consists in the different parts and combination of parts hereinafter described, and particularly pointed out in the claims.

Similar figures of reference indicate corresponding parts in all the figures of the drawings.

In the accompanying drawings, 1 represents the frame of the roller, which is formed of a length to correspond substantially with the length of the roller designed to be constructed. To the frame 1 is securely attached in any convenient and well-known manner the tongue 2, to which tongue is attached the bracket 3, which bracket may be substantially of the form shown, and, as shown, it is provided with the ledge or flange 4, which flange is for the purpose of supporting the doubletree. To the bottom or lower end of the bracket 3 is securely attached in any convenient and well-known manner the draft-bar 5, which bar is located substantially as shown in the drawings. To the draft-bar 5 are pivotally attached the roller-yokes 6, which roller-yokes extend rearward, and to their rear ends are journaled the rollers 7, which rollers are located substantially as shown in Fig. 1, and in said figure three rollers are illustrated, each roller independently journaled to the yokes 6. It will be understood, however, that a greater or less number of rollers, such as 7, can be employed without departing from the nature of my invention.

For the purpose of providing braces for the yokes 6 the downward-extending arms 8, 9, 10, and 11 are provided, which downward-extending arms are securely attached to the front or forward edge of the frame 1. The arms 8, 9, 10, and 11 are each provided with the slots 12, through which slots the members of the yokes 6 are passed, as illustrated in Fig. 1. The slots 12 are so located that their top or upper ends will bear upon the members of the different yokes, thereby forming a support for the frame 1 and preventing the frame from coming downward so as to strike the top or upper portions of the rollers 7. The slots 12, however, are formed of sufficient length to allow the rollers 7 to change their positions with reference to the frame 1, so that they will conform in a measure with the uneven surface of the ground over which the roller proper is passed.

It will be understood that by pivotally connecting the yokes to the draft-bar 5 said yokes will be free to rock upon the connecting-bolts 13, which connecting-bolts are formed of sufficient strength to move or draw the rollers 7 forward.

The ends of the frame 1 are each provided with the downward-extending bracket 14. To the bottom or lower portions of said brackets are pivotally connected the L-shaped bars 15, the horizontal portions of which are extended to considerable length, and to which horizontal portions are journaled the pulverizing-rollers 16 by means of the bearings 17, which bearings are securely connected to the horizontal portions of the L-shaped bars 15. The vertical portions of the L-shaped bars 15 are extended upward, so that their top or upper ends will come to the top of the frame 1, or substantially so, said arrangement being for the purpose hereinafter described.

To the brackets 14 or their equivalents are attached the flanges 18, which flanges are located substantially as shown in the drawings and are for the purpose of supporting the bars 20, around which bars are located the springs 21, said springs being located between the vertical portion of the bars 15 and one of the flanges 18, as illustrated in the drawings. The springs 21 are for the purpose of forcing the horizontal portions of the bars 15 downward, thereby holding the pulverizing-rollers 16 in close contact with the surface of the ground when it is desired to have said pulverizing-rollers in an operative position.

When it is desired to have the pulverizing-rollers located in front of the rollers 7, the L-shaped bars 15 are located as shown in Fig. 1, and when it is desired to have the pulverizing-rollers 16 follow the rollers, or, in other words, to have the rollers go in advance of the pulverizing-rollers, the L-shaped bars 15 are placed in the position illustrated in Fig. 4. This object is accomplished by removing the bars and their springs 21, together with the bars 15, from the brackets 14, after which said bars 15, together with the pulverizing-rollers, are changed end for end and connected to the bearing 22 and held in proper position by means of the cotters 23 or their equivalents. The bars 20 and the springs 21 are changed so as to bring them upon opposite sides of the vertical portions of the bars 15 from that shown in Fig. 1, or, in other words, springs 21 and the bars 20 are placed in the position illustrated in Fig. 4, when it is desired to have the pulverizing-rollers follow the rollers 7. For the purpose of elevating the pulverizing-rollers 16, so that they will be carried above the surface of the ground, as indicated in the dotted lines, Fig. 4, the lever 24 is provided, which lever is pivotally attached to the tongue 2 or its equivalent, and to said lever are connected the rods 25, which rods extend forward or backward, as the case may be, and are attached to the bar 26, which bar is securely bolted or otherwise attached to the outer ends of the bars 15, substantially as shown in Fig. 1.

It will be understood that the rods 25 should be so connected that they may be easily detached from the bar 26 and turned backward or forward, so as to bring said rods into operative position when the position of the pulverizing-rollers is changed from the rear of the roller to the front thereof, or vice versa.

For the purpose of holding the pulverizing-rollers in an elevated position the rack-bar 27 is provided, which rack-bar is provided with teeth, such as 28, which teeth are for the purpose of engaging the plate 29, located upon the lever 24, or, if desired, a lip may be formed upon said lever 24.

Having fully described my invention, what I claim as new, and desire to secure by Letters Patent, is—

1. The combination of a frame, a roller or rollers located below the frame and journaled to yokes, a draft-bar 5, arms extended below the frame and provided with slots, and a tongue connected to the frame and to the draft-bar, substantially as and for the purpose specified.

2. The combination of a frame having connected thereto a tongue, a bracket secured to the tongue and carrying a draft-bar, yokes pivotally connected to the draft-bar, rollers journaled to the yokes, downward-extending arms secured to the frame and provided with slots through which the members of the yokes pass, substantially as and for the purpose specified.

3. The combination of a frame, a tongue connected thereto and to a draft-bar a draft-bar and yokes having journaled thereto rollers, brackets 14, connected to the ends of the frame, L-shaped bars pivotally connected to the brackets 14, pulverizing-rollers journaled to the bars 15, means for holding the pulverizing-rollers in an elevated position, and springs 21, substantially as and for the purpose specified.

4. The combination of the frame 1, provided with downward-extending arms having slots, a tongue secured to the frame and to the draft-bar, yokes pivoted to the draft-bar 5, rollers journaled to the yokes, brackets secured to the ends of the frame, and provided with flanges 18, the bars 15, carrying pulverizing-rollers, springs 21, and means for elevating the pulverizing-rollers, substantially as and for the purpose specified.

In testimony that I claim the above I have hereunto subscribed my name in the presence of two witnesses.

HIRAM TAYLOR.

Witnesses:
W. M. WELCH,
J. D. FOUNTAIN.